(12) United States Patent
Yoshikawa

(10) Patent No.: US 10,414,167 B2
(45) Date of Patent: Sep. 17, 2019

(54) IMAGE PROCESSING METHOD, PRINTING METHOD, IMAGE PROCESSOR, AND PRINTING APPARATUS

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/872,387

(22) Filed: Jan. 16, 2018

(65) Prior Publication Data
US 2018/0207947 A1    Jul. 26, 2018

(30) Foreign Application Priority Data

Jan. 25, 2017 (JP) ................................. 2017-010968
Nov. 2, 2017 (JP) ................................. 2017-212509

(51) Int. Cl.
  *B41J 2/21* (2006.01)
  *B41J 2/045* (2006.01)
  *G06K 15/02* (2006.01)

(52) U.S. Cl.
  CPC ......... *B41J 2/2103* (2013.01); *B41J 2/04558* (2013.01); *B41J 2/04581* (2013.01); *G06K 15/1872* (2013.01)

(58) Field of Classification Search
  CPC ..... B41J 2/3555; B41J 2/36; B41J 2/42; B41J 2/362; B41J 2/2103; B41J 2/04558; B41J 2/04581; G06K 15/1872
  See application file for complete search history.

(56) References Cited

U.S. PATENT DOCUMENTS

| 5,706,043 A * | 1/1998 | Okada ........................ B41J 2/36 347/185 |
| 9,296,230 B2 * | 3/2016 | Komamiya ............ B41J 19/147 |
| 2007/0046725 A1 | 3/2007 | Hoshiyama et al. |
| 2014/0176966 A1 | 6/2014 | Kuno |
| 2016/0279927 A1 | 9/2016 | Miyamoto |

FOREIGN PATENT DOCUMENTS

| EP | 1679192 A1 | 7/2006 |
| JP | 2001-047614 A | 2/2001 |
| JP | 2009-137247 A | 6/2009 |

OTHER PUBLICATIONS

The Extended European Search Report for the corresponding European Patent Application No. 18153462.9 dated Jun. 27, 2018.

\* cited by examiner

*Primary Examiner* — Thinh H Nguyen

(57) ABSTRACT

An image processing method is for generating print data to cause a printing apparatus that prints a print image based on image data to execute printing, by repeating a pass operation in which a nozzle set forms dots on a printing medium while moving in a main scanning direction, and a feed operation in which the nozzle set and the printing medium are moved in a sub-scanning direction. The image processing method includes: performing a first and second halftone processes for a same region of the image data to respectively generate a first halftone data to determine a formation state of first dots and a second halftone data to determine a formation state of second dots, the first and second dots being formed by the nozzle set that ejects a same color of ink; and allocating the first halftone data and the second halftone data to pass operations.

15 Claims, 16 Drawing Sheets

IMAGE PROCESSING METHOD, PRINTING METHOD, IMAGE PROCESSOR, AND PRINTING APPARATUS

CROSS-REFERENCE TO RELATED-APPLICATIONS

This application claims priority to Japanese Application No. 2017-010968 filed on Jan. 25, 2017 and Japanese Application No. 2017-212509 filed on Nov. 2, 2017. The entire disclosures of Japanese Application Nos. 2017-010968 and 2017-212509 are hereby incorporated herein by reference.

BACKGROUND

1. Technical Field

The present invention relates to an image processing method, a printing method using the image processing method, an image processor, and a printing apparatus including the image processor.

2. Related Art

A serial type ink jet printer includes a head in which nozzle arrays to eject the ink droplets are formed, and forms an image on a printing medium by alternately repeating a pass operation to eject ink droplets while moving the head in a main scanning direction (main scanning) and a transport operation to move the printing medium in a transport direction (sub-scanning direction) that intersects with the main scanning direction (sub-scanning) such that dots (dot arrays) arranged in the main scanning direction are arranged in the sub-scanning direction.

Such an ink jet printer has employed a method of increasing the number of nozzles, as a method of further increasing a printing speed. To be more specific, the number of dots formed in one pass of main scanning (pass operation) is increased by increasing the number of nozzles per head or arranging multiple heads, thereby increasing the printing speed.

When multiple heads are arranged to form one head, a difference in ink ejection characteristics (variation in ink ejection amount or ejection direction) among the individual heads arranged may affect printing quality such as color unevenness elicited by a variation in size or position among dots formed. To counter this problem, JP-A-2001-47614 describes an ink jet recording apparatus (printing apparatus) including a drive waveform generation data correction section capable of correcting a variation in ink ejection amount or ejection timing.

However, the ink jet recording apparatus described in JP-A-2001-47614 needs to perform correction corresponding to the ink ejection characteristics of each head. This leads to a problem that the need to provide each head with a unit that corrects drive waveform generation data hinders cost reduction. There is also a need to obtain a correction amount corresponding to the ink ejection characteristics of each head, leading to a problem that adjustment takes time.

SUMMARY

An advantage of some aspects of the invention can be realized as the following application examples or embodiments.

An image processing method according to one aspect is a method of generating print data to cause a printing apparatus that prints a print image based on image data to execute printing, by repeating a pass operation in which a nozzle set forms dots on a printing medium by ejecting ink droplets while moving relative to the printing medium in a main scanning direction, and a feed operation in which the nozzle set and the printing medium are moved relative to each other in a sub-scanning direction that intersects with the main scanning direction. The image processing method includes: performing a first halftone process and a second halftone process for a same region of the image data to respectively generate a first halftone data to determine a formation state of first dots and a second halftone data to determine a formation state of second dots, the first dots and the second dots being formed by the nozzle set that ejects a same color of ink; and allocating the first halftone data and the second halftone data to pass operations.

According to this aspect, the image processing method includes: performing a plurality of halftone processes to generate halftone data to determine the formation state of dots formed by the nozzle set that eject the same color of ink, for each region of image data; and allocating the generated halftone data to the pass operations. More specifically, formation of a print image of each color can be performed using a plurality of halftone data generated separately by applying the plurality of halftone processes to each region of the image data.

As a result, for example, when the nozzle set is configured as one head (hereinafter referred to as the large head to be differentiated from the individual heads arranged) that ejects the same color of ink by arranging the plurality of heads, halftone data corresponding to the individual heads included in the large head is generated separately for the entire region of the image data, and printing in the entire image region can be performed for each head based on the halftone data. More specifically, a print image with no color unevenness (suppressed color unevenness) based on uniform ink ejection characteristics (including no variation among the individual heads) can be obtained for each head by allowing the individual heads to perform printing across the entire image region. A print image with suppressed color unevenness can be printed, even when there is a variation in ink ejection characteristics among the individual heads, by sharing printing with the heads (allocating to pass operations) so that a print image based on the image data is formed by superimposing print images formed by the individual heads.

As a result, there is no longer need to perform correction corresponding to the ink ejection characteristics of each head in order to suppress a variation in ink ejection characteristics among the heads. That is, there is no longer need to obtain a correction amount corresponding to the ink ejection characteristics of each head. Moreover, there is no longer need to provide a correction section that corrects the correction amount obtained for each head.

In the image processing method according to another aspect, the nozzle set includes a first nozzle group and a second nozzle group, and the first halftone process corresponds to the first nozzle group and the second halftone process corresponds to the second nozzle group.

According to this aspect, the plurality of halftone processes for the same region of the image data include halftone processes corresponding to the plurality of nozzle groups included in the nozzle set, respectively. More specifically, printing can be performed using halftone data generated separately for each nozzle group.

As a result, a print image with no color unevenness (suppressed color unevenness) based on uniform ink ejection characteristics (including no variation among the heads) can be obtained for each nozzle group by allowing the individual nozzle groups to perform printing across the entire image region. A print image with suppressed color unevenness can be printed, even when there is a variation in ink ejection characteristics among the nozzle groups, by sharing printing with the nozzle groups (allocating to pass operations) so that a print image based on the image data is formed by superimposing print images formed by the individual nozzle groups.

As a result, there is no longer need to perform correction corresponding to the ink ejection characteristics of each nozzle group in order to suppress a variation in ink ejection characteristics among the nozzle groups. That is, there is no longer need to obtain a correction amount corresponding to the ink ejection characteristics of each nozzle group. Moreover, there is no longer need to provide a correction section that corrects the correction amount obtained for each nozzle group.

Moreover, for example, when the nozzle set having the same or similar ink ejection characteristics are divided into nozzle groups, printing in the entire image region can be performed based on each halftone data for each nozzle group. Therefore, a print image with less variation among the nozzles and no color unevenness (or suppressed color unevenness) can be obtained for each nozzle group. Moreover, such a print image with no color unevenness (or suppressed color unevenness) can be efficiently printed by sharing printing with the respective nozzle groups (allocating to pass operations) so that a print image based on the image data is formed by superimposing print images for the respective nozzle groups.

As the nozzle groups, for example, one head chip or the like can be applied, including a plurality of nozzles manufactured in the same manufacturing environment or under the same manufacturing conditions.

In the image processing method according to another aspect, the first halftone process uses a dither method and the second halftone process uses an error diffusion method.

According to this aspect, the plurality of halftone processes to be applied to the same region of the image data include a halftone process using a dither method and a halftone process using an error diffusion method. Therefore, in formation of a print image of each color, printing can be performed using a plurality of halftone data generated separately by applying the plurality of halftone processes such as the halftone process using the dither method and the halftone process using the error diffusion method for the same region of the image data.

As a result, for example, when the nozzle set is divided into nozzle groups having the same or similar ink ejection characteristics, a print image based on the image data can be formed by superimposing print images formed by the respective nozzle groups. Moreover, print images formed by the respective nozzle groups are formed based on the different halftone data obtained by the plurality of different halftone processes, including the halftone process using the dither method and the halftone process using the error diffusion method. Therefore, when the print images formed by the nozzle groups having different ink ejection characteristics are superimposed in the same region, a difference in ink ejection characteristics among the nozzle groups can be dispersed within the image region, compared to the case where the respective print images are formed based on the same halftone data generated by performing the same halftone processes on the same image data. Thus, printing can be performed while further suppressing reduction in printing quality.

In the image processing method according to another aspect, the first halftone process uses a first dither matrix and the second halftone process uses a second dither matrix that is different from the first dither matrix.

According to this aspect, dither matrices for use in the plurality of halftone processes to be applied to the same region of the image data include different dither matrices. Therefore, for example, when a print image based on the image data is formed by dividing the nozzle set into nozzle groups having the same or similar ink ejection characteristics and by superimposing print images formed by the respective nozzle groups in the same region, a difference in ink ejection characteristics among the nozzle groups can be dispersed within the image region, compared to the case where the respective print images are formed based on the same halftone data generated by performing the halftone processes using the same dither matrix on the same image data. Thus, printing can be performed while further suppressing reduction in printing quality.

In the image processing method according to another aspect, the first halftone process uses a first error diffusion method and the second halftone process uses a second error diffusion method that is different from the first error diffusion method.

According to this aspect, the error diffusion method for use in the plurality of halftone processes applied to the same region of the image data includes different error diffusion methods. Therefore, for example, when a print image based on the image data is formed by dividing the nozzle set into nozzle groups having the same or similar ink ejection characteristics and by superimposing print images formed by the respective nozzle groups in the same region, a difference in ink ejection characteristics among the nozzle groups can be dispersed within the image region, compared to the case where the respective print images are formed based on the same halftone data generated by performing the halftone processes using the same error diffusion method on the same image data. Thus, printing can be performed while further suppressing reduction in printing quality.

In the image processing method according to another aspect, the first halftone process uses a first matrix coordinate where the formation state of the first dots is developed, and the second halftone process uses a second matrix coordinate where the formation state of the second dots is developed, the second matrix coordinate being different from the first matrix coordinate.

According to this aspect, the matrix coordinates for developing the determined formation state of dots for use in the plurality of halftone processes applied to the same region of the image data include different matrix coordinates. The matrix coordinates are dot matrix coordinates for developing the result of the halftone processes. The different matrix coordinates are, for example, those obtained by shifting the coordinate axis by a specified fraction of a dot pitch in the main scanning direction. Therefore, for example, when a print image based on the image data is formed by dividing the nozzle set into nozzle groups having the same or similar ink ejection characteristics and by superimposing print images formed by the respective nozzle groups in the same region, printing with higher uniformity of in-plane distribution of ink can be performed, compared to the case where print images are formed based on the halftone data obtained by developing the result of the halftone processes based on the same image data at the same matrix coordinates.

A printing method according to another aspect includes generating print data using the image processing method according to any of the above aspects; and performing printing by a printing apparatus based on the print data.

With the printing method according to this aspect, printing is performed based on the print data generated by the image processing method according to the above application example. Thus, a print image with suppressed color unevenness can be efficiently printed even with the printing apparatus including the plurality of nozzle groups (e.g., heads) having a difference in ink ejection characteristics (variation in ink ejection amount or ejection direction).

As a result, there is no longer need to perform correction corresponding to the ink ejection characteristics of each nozzle group. That is, there is no longer need to obtain a correction amount corresponding to the ink ejection characteristics of each nozzle group. Moreover, there is no longer need to provide a correction section that corrects the correction amount obtained for each nozzle group.

An image processor according to another aspect generates print data to cause a printing apparatus that prints a print image based on image data to execute printing, by repeating a pass operation in which a nozzle set forms dots on a printing medium by ejecting ink droplets while moving relative to the printing medium in a main scanning direction, and a feed operation in which the nozzle set and the printing medium are moved relative to each other in a sub-scanning direction that intersects with the main scanning direction. The image processor includes: a halftone processor configured to perform a first halftone process and a second halftone process for a same region of image data to respectively generate a first halftone data to determine a formation state of first dots and a second halftone data to determine a formation state of second dots, the first dots and the second dots being formed by the nozzle set that ejects a same color of ink; and an allocator configured to allocate the first halftone data and the second halftone data to pass operations.

The image processing apparatus according to this aspect includes: a halftone processor that performs a plurality of halftone processes to generate halftone data to determine the formation state of dots formed by the nozzle set that eject the same color of ink, for the same region of image data; and an allocator that allocates the generated halftone data to the pass operations. More specifically, formation of a print image of each color can be performed using a plurality of halftone data generated separately by applying the plurality of halftone processes to the same region of the image data.

As a result, for example, when the nozzle set is configured as one large head that ejects the same color of ink by arranging the plurality of heads in the printing apparatus, halftone data corresponding to the individual heads included in the large head is generated separately for the entire region of the image data, and printing in the entire image region can be performed for each head based on the halftone data. More specifically, a print image with no color unevenness (suppressed color unevenness) based on uniform ink ejection characteristics (including no variation among the heads) can be obtained for each head by allowing the individual heads to perform printing across the entire image region. A print image with suppressed color unevenness can be printed, even when there is a variation in ink ejection characteristics among the heads, by sharing printing with the heads (allocating to pass operations) so that a print image based on the image data is formed by superimposing print images formed by the individual heads.

As a result, the printing apparatus eliminates the need to perform correction corresponding to the ink ejection characteristics of each head in order to suppress a variation in ink ejection characteristics among the heads. That is, there is no longer need to obtain a correction amount corresponding to the ink ejection characteristics of each head. Moreover, there is no longer need to provide a correction section that corrects the correction amount obtained for each head.

A printing apparatus according to another aspect is includes: the image processor according to the above aspect; and a print unit configured to perform printing based on the print data generated by the image processor.

According to this aspect, a print image with suppressed color unevenness can be efficiently printed without performing correction corresponding to the ink ejection characteristics of each head, even when there is a variation in ink ejection characteristics among the heads included in the print unit. More specifically, the printing apparatus according to this application example eliminates the need to obtain a correction amount corresponding to the ink ejection characteristics of each head and also to provide a correction section that corrects the correction amount obtained for each head during manufacturing or adjustment. Thus, the printing apparatus according to this application example is manufactured or adjusted more easily and provided at a lower cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
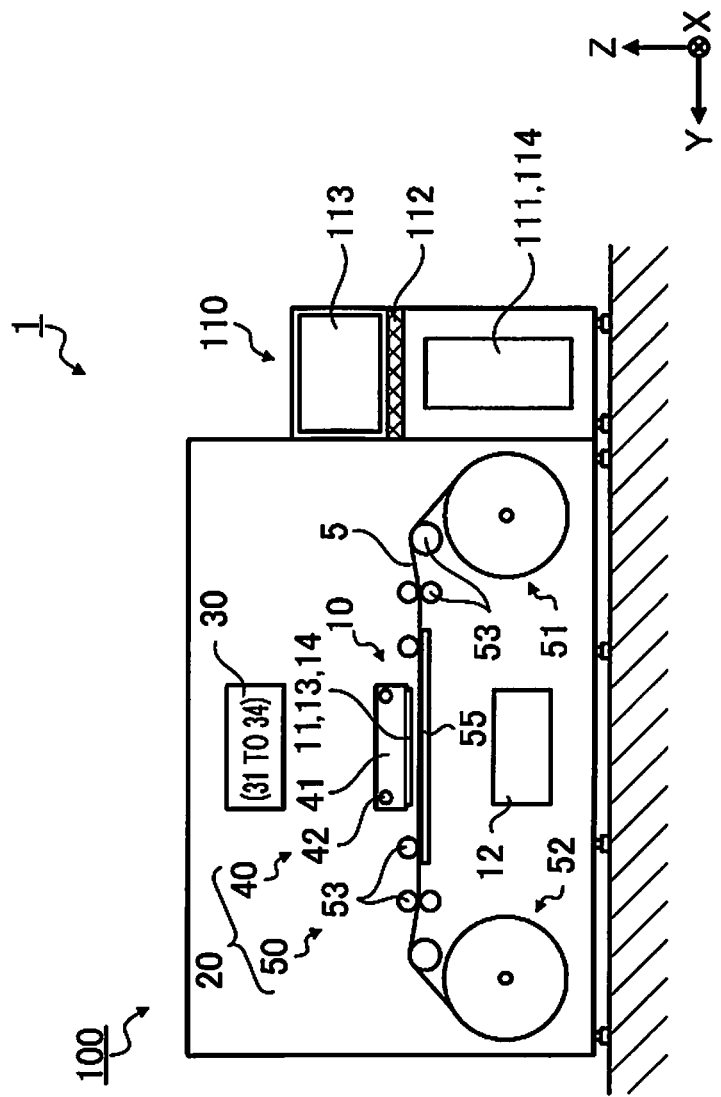
FIG. 1 is a front view showing a configuration of a printing system as a printing apparatus according to Embodiment 1.

With reference to the drawings, description is given below of embodiments of the invention. The following is an embodiment of the invention and is not intended to limit the invention. Note that the respective drawings may be illustrated not-to-scale, for illustrative clarity. Also, as for coordinates given in the drawings, it is assumed that a Z-axis direction is a top/bottom direction, a +Z-direction is a top direction, an X-axis direction is a front/rear direction, a −X-direction is a front direction, a Y-axis direction is a left/right direction, a +Y-direction is a left direction, and an X-Y plane is a horizontal plane.

Embodiment 1

Figure 2:
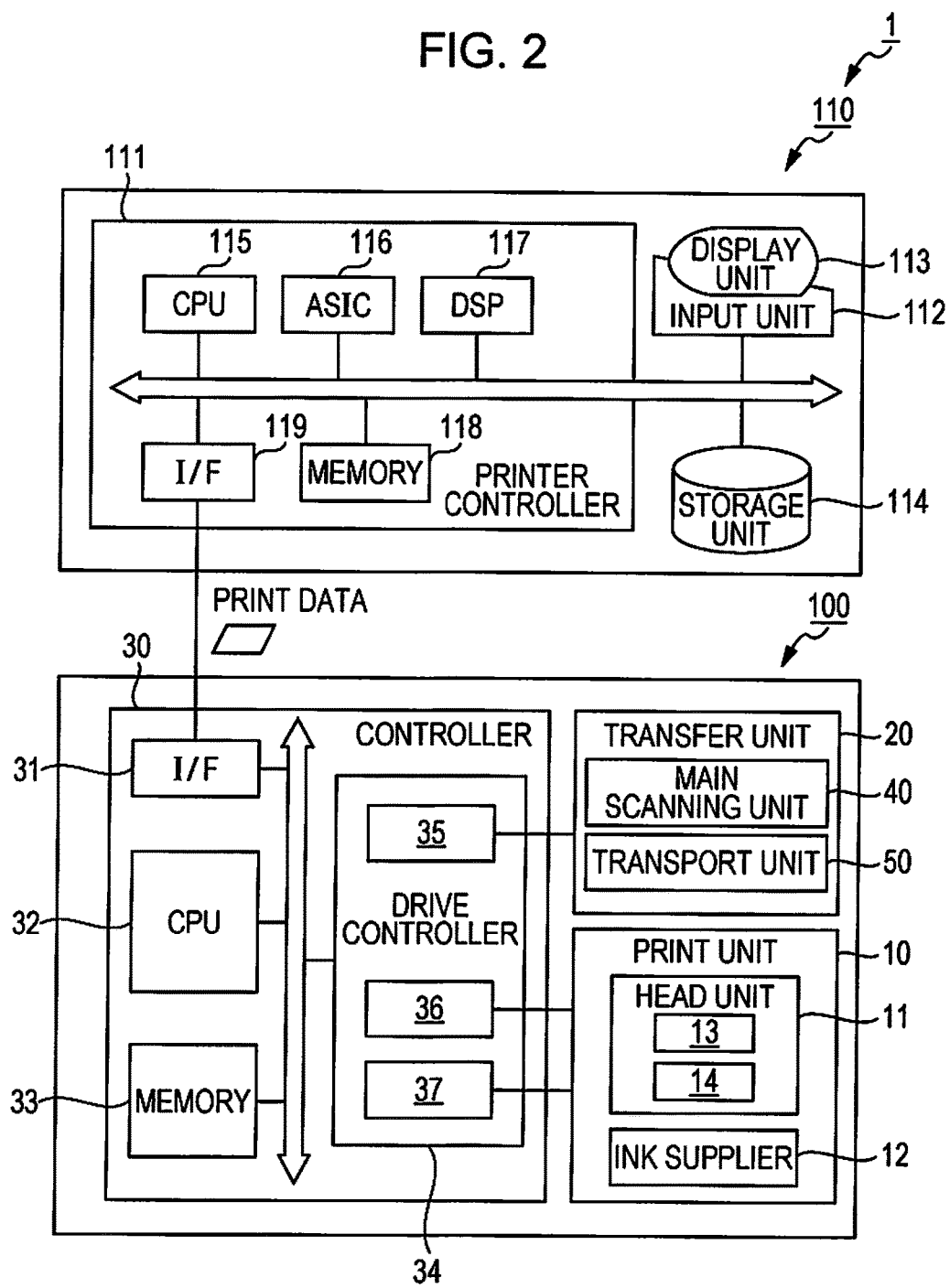
FIG. 2 is a block diagram showing the configuration of the printing system as the printing apparatus according to Embodiment 1.

FIG. 1 is a front view showing a configuration of a printing system 1 as a "printing apparatus" according to Embodiment 1, and FIG. 2 is a block diagram thereof.

The printing system 1 includes a printer 100 and an image processor 110 connected to the printer 100. The printer 100 is an ink jet printer that prints a desired image on a roll paper 5 as a long "printing medium", which is fed in a state of being wound into a roll, based on print data received from the image processor 110.

Basic Configuration of Image Processor

The image processor 110 includes a printer controller 111, an input unit 112, a display unit 113, a storage unit 114, and the like, and controls a print job to allow the printer 100 to perform printing. The image processor 110 is configured using a personal computer as a preferable example.

Software operated by the image processor 110 includes general image processing application software (hereinafter referred to as the application) for handling image data to be printed and printer driver software (hereinafter referred to as the printer driver) for controlling the printer 100 and for generating print data to allow the printer 100 to execute printing.

More specifically, the image processor 110 generates print data to allow the printer 100 to print a print image based on the image data.

Note that the printer driver is not limited to a configuration example as a functional unit using software but may also be configured using firmware, for example. The firmware is implemented on a system on chip (SOC) in the image processor 110, for example.

The printer controller 111 includes a CPU 115, an ASIC 116, a DSP 117, a memory 118, a printer interface unit (I/F) 119, and the like, and centrally controls the entire printing system 1.

The input unit 112 is an information input section as a human interface. To be more specific, the input unit 112 is, for example, a port or the like for connecting a keyboard and an information input device.

The display unit 113 is an information display section (display) as a human interface. The display unit 113 displays information inputted from the input unit 112, an image to be printed by the printer 100, information related to a print job, and the like under the control of the printer controller 111.

The storage unit 114 is a rewritable storage medium such as a hard disk drive (HDD) and a memory card. The storage unit 114 stores software run by the image processor 110 (programs run by the printer controller 111), an image to be printed, information related to a print job, and the like.

The memory 118 is a storage medium that secures a space for storing programs operated by the CPU 115, a work space for running the programs, and the like. The memory 118 includes a storage element such as a RAM and an EEPROM.

Basic Configuration of Printer 100

The printer 100 includes a print unit 10, a transfer unit 20, a controller 30, and the like. Upon receipt of the print data from the image processor 110, the printer 100 uses the controller 30 to control the print unit 10 and the transfer unit 20, thereby printing an image (forming an image) on the roll paper 5.

The print data is image formation data obtained by converting the image data so that the printer 100 can perform printing thereof using the application and printer driver included in the image processor 110. The print data includes a command to control the printer 100.

The image data includes, for example, general full-color image information obtained by a digital camera or the like, text information, and the like.

The print unit 10 includes a head unit 11, an ink supplier 12, and the like.

The transfer unit 20 includes a main scanning unit 40, a transport unit 50, and the like. The main scanning unit 40 includes a carriage 41, a guide shaft 42, a carriage motor (not shown), and the like. The transport unit 50 includes a supply unit 51, a housing unit 52, transport rollers 53, a platen 55, and the like.

The head unit 11 includes a print head 13 having multiple nozzles (nozzle set) that eject printing ink (hereinafter referred to as the ink) as ink droplets, and also includes a head controller 14. The head unit 11 is mounted on the carriage 41 and moves back and forth in a main scanning direction (X-axis direction shown in FIG. 1) along with the carriage 41 that moves in the main scanning direction. The head unit 11 (print head 13) form dot arrays (raster lines) along the main scanning direction on the roll paper 5 by ejecting ink droplets onto the roll paper 5 supported on the platen 55 under the control of the controller 30 while moving in the main scanning direction.

The ink supplier 12 includes an ink tank, an ink supply channel (not shown) to supply the ink to the print head 13 from the ink tank, and the like.

Examples of the ink include a four color ink set obtained by adding black (K) to a three color ink set including cyan (C), magenta (M), and yellow (Y), as an ink set of dark ink compositions. Examples of the ink also include an eight color ink set obtained by adding an ink set of light ink compositions, such as light cyan (Lc), light magenta (Lm), light yellow (Ly), and light black (Lk), with reduced concentrations of the respective color materials. The ink tank, the ink supply channel, and an ink supply path to nozzles that eject the same ink are provided separately for each ink.

As for a method of ejecting ink droplets (ink jet method), a piezo method is employed. The piezo method is a method of printing by using a piezoelectric element (piezo element) to apply a pressure corresponding to a print information signal to the ink stored in a pressure chamber, and thus jetting (ejecting) ink droplets from nozzles communicated with the pressure chamber.

Note that the method of ejecting ink droplets is not limited thereto, but any other printing method may be employed, whereby ink is jetted in the form of ink droplets to form dot groups on a printing medium. Examples of such a method may include: a method of printing by continuously jetting ink in the form of ink droplets from nozzles by use of an intense electric field between the nozzles and an accelerating electrode provided in front of the nozzles, and by sending a print information signal from a deflecting electrode while the ink droplets are in flight; a method (electrostatic suction method) whereby the ink droplets are jetted, without being deflected, according to the print information signal; a method whereby ink droplets are forcibly jetted by pressurizing ink with a small pump and mechanically vibrating the nozzles with a crystal oscillator or the like; a method (thermal jet method) for printing by heating and foaming ink with a microelectrode according to a print information signal and thus jetting ink droplets; and the like.

The transfer unit 20 (the main scanning unit 40 and the transport unit 50) moves the roll paper 5 relative to the head unit 11 (print head 13) under the control of the controller 30.

The guide shaft 42 extends in the main scanning direction and supports the carriage 41 in a slidably contact state. The carriage motor serves as a drive source to move the carriage 41 back and forth along the guide shaft 42. More specifically, the main scanning unit 40 (the carriage 41, the guide shaft 42, and the carriage motor) moves the carriage 41 (i.e., the print head 13) in the main scanning direction along the guide shaft 42 under the control of the controller 30.

The supply unit 51 rotatably supports a reel with the roll paper 5 rolled therearound, and sends the roll paper 5 to a transport path. The housing unit 52 rotatably supports the reel that rolls up the roll paper 5, and rolls up the printed roll paper 5 from the transport path.

The transport rollers 53 include: drive rollers to move the roll paper 5 in a transport direction (Y-axis direction shown in FIG. 1) that intersects with the main scanning direction; driven rollers rotated along with the movement of the roll paper 5; and the like. The transport rollers 53 form the transport path along which the roll paper 5 is transported from the supply unit 51 to the housing unit 52 through a print region (region where the print head 13 moves in the main scanning direction on the upper surface of the platen 55) of the print unit 10.

The controller 30 includes an interface unit (I/F) 31, a CPU 32, a memory 33, a drive controller 34, and the like, and controls the printer 100.

The interface unit 31 is connected to the printer interface unit 119 in the image processor 110 to transmit and receive data between the image processor 110 and the printer 100. The image processor 110 and the printer 100 may be connected directly with a cable or the like, or indirectly through a network or the like. Alternatively, the interface unit 31 may transmit and receive data between the image processor 110 and the printer 100 through wireless communication.

The CPU 32 is an arithmetic processing unit for overall control of the printer 100.

The memory 33 is a storage medium that secures a space for storing programs operated by the CPU 32, a work space for running the programs, and the like. The memory 33 includes a storage element such as a RAM and an EEPROM.

The CPU 32 controls the print unit 10 and the transfer unit 20 through the drive controller 34 according to the program stored in the memory 33 and the print data received from the image processor 110.

The drive controller 34 controls driving of the print unit 10 (the head unit 11 and the ink supplier 12) and the transfer unit 20 (the main scanning unit 40 and the transport unit 50) under the control of the CPU 32. The drive controller 34 includes a transfer control signal generating circuit 35, an ejection control signal generating circuit 36, and a drive signal generating circuit 37.

The transfer control signal generating circuit 35 is a circuit that generates a signal to control the transfer unit 20 (the main scanning unit 40 and the transport unit 50) according to an instruction from the CPU 32.

The ejection control signal generating circuit 36 is a circuit that generates a head control signal for selecting nozzles to eject ink, selecting an ejection amount, controlling the ejection timing, and the like according to an instruction from the CPU 32 based on the print data.

The drive signal generating circuit 37 is a circuit that generates a basic drive signal including a drive signal to drive the piezoelectric elements in the print head 13.

The drive controller 34 selectively drives the piezoelectric elements corresponding to the respective nozzles, based on the head control signal and the basic drive signal.

With the above configuration, the controller 30 forms (prints) a desired image on the roll paper 5 by repeating a pass operation to eject (provide) ink droplets from the print head 13 while the print head 13 is moving the carriage 41 in the main scanning direction (X-axis direction), the carriage 41 supporting the print head 13 along the guide shaft 42, onto the roll paper 5 supplied to the print region by the transport unit 50 (the supply unit 51 and the transport rollers 53), and a transport operation (feed operation) to move the roll paper 5 in the transport direction (+Y-direction) as a "sub-scanning direction" that intersects with the main scanning direction by the transport unit 50 (transport rollers 53).

Basic Functions of Printer Driver of Related Art

Figure 3:
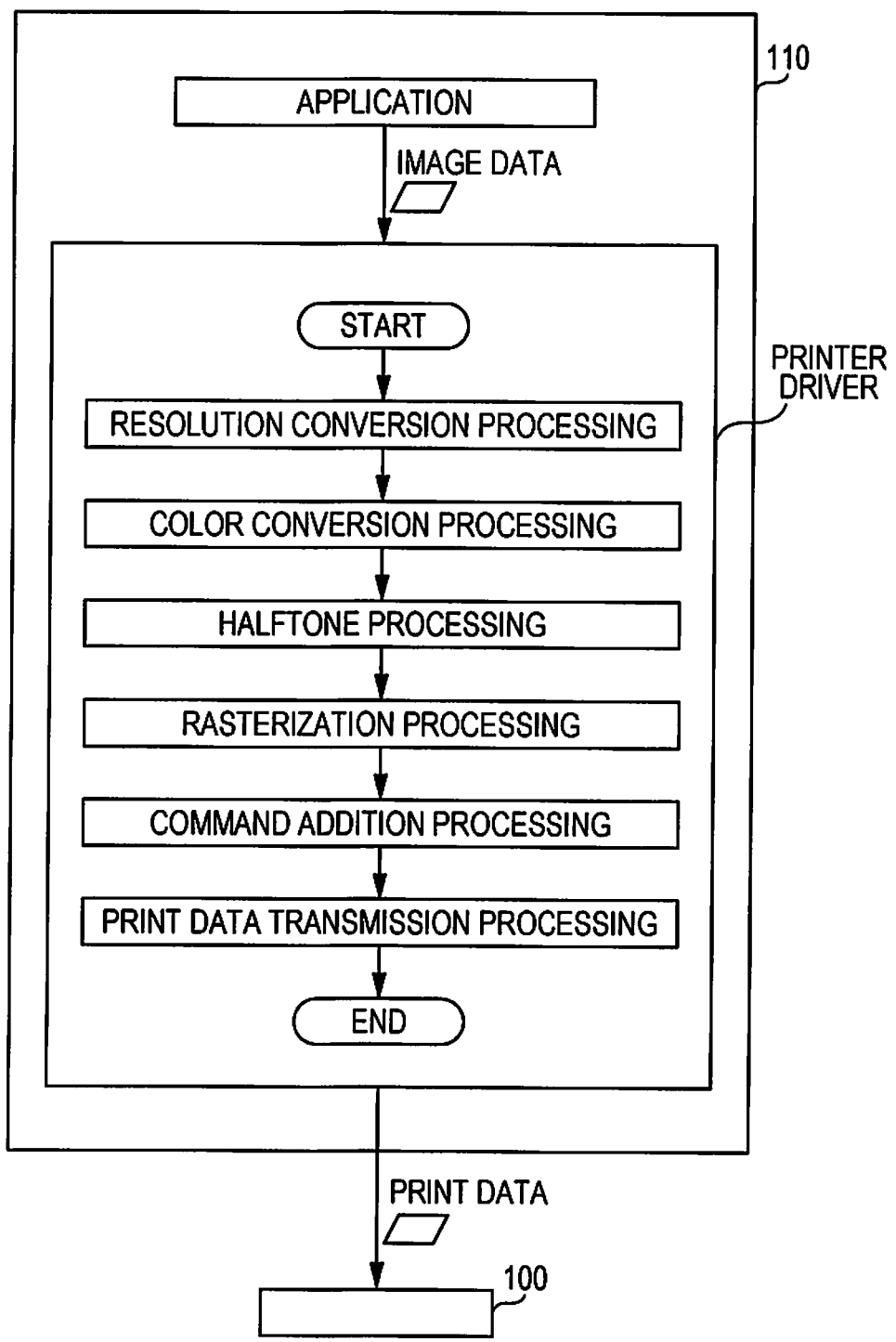
FIG. 3 is an explanatory diagram showing basic functions of a printer driver according to the related art.

FIG. 3 is an explanatory diagram showing basic functions of a printer driver according to the related art.

Printing on the roll paper 5 is started by transmitting print data to the printer 100 from the image processor 110. The print data is generated by the printer driver.

With reference to FIG. 3, description is given below of print data generation processing according to the related art.

The printer driver receives image data from an application, converts the image data into print data in the format that can be interpreted by the printer 100, and then outputs the print data to the printer 100. For the conversion of the image data from the application into the print data, the printer driver performs resolution conversion processing, color conversion processing, halftone processing, rasterization processing, command addition processing, and the like.

The resolution conversion processing is processing of converting the image data outputted from the application into a resolution for printing (print resolution) on the roll paper 5. For example, when the print resolution is specified to 720×720 dpi, vector format image data received from the application is converted into bit map format image data with the 720×720 dpi resolution. Each pixel data in the image data after the resolution conversion processing includes pixels arranged in a matrix pattern. Each pixel has a tone value in 256 tones, for example, in the RGB color space. That is, each piece of the pixel data after the resolution conversion shows the tone value of the corresponding pixel.

The pixel data corresponding to one row of pixels arranged in a predetermined direction among the pixels arranged in the matrix pattern is called raster data. Note that the predetermined direction in which the pixels corresponding to the raster data are arranged corresponds to the direction (main scanning direction) in which the print head 13 moves when printing an image.

The color conversion processing is processing of converting RGB data into data of a CMYK color system space. CMYK refers to cyan (C), magenta (M), yellow (Y), and black (K). The image data of the CMYK color system space is data corresponding to colors of ink that the printer 100 has. Therefore, when the printer 100 uses ten types of ink of the CMYK color system, the printer driver generates image data in a ten-dimensional space of the CMYK color system, based on the RGB data.

This color conversion processing is performed based on a table (color conversion look-up table LUT) in which the tone values of the RGB data and the tone values of the CMYK color system data are associated with each other. Note that the pixel data after the color conversion processing is the CMYK color system data of 256 tones, for example, expressed in the CMYK color system space.

The halftone processing is processing of converting data of a large number of tones (256 tones) into data of a number of tones that can be formed by the printer 100. Through this halftone processing, data expressing 256 tones is converted into halftone data to determine a dot formation state, such as 1-bit data expressing two tones (dot and no dot) and 2-bit data expressing four tones (no dot, small dot, medium dot, and large dot). To be more specific, a dot generation rate corresponding to the tone value (e.g, in the case of four tones, a generation rate of each of no dot, small dot, medium dot, and large dot) is obtained from a dot generation rate table in which the tone values (0 to 255) and dot generation rates are associated with each other. Then, with the generation rate thus obtained, pixel data is created such that dots are formed in a distributed manner, by using a dither method, an error diffusion method or the like. Accordingly, the halftone processing generates halftone data to determine the formation state of dots formed by the nozzle set that ejects the same color of ink.

The rasterization processing is processing of rearranging the pixel data (e.g., 1-bit or 2-bit halftone data as described above) in the matrix pattern, according to the dot formation order for printing. The rasterization processing includes allocation processing of allocating the image data including the pixel data after the halftone processing (halftone data) to each pass operation in which the print head 13 (nozzle arrays) ejects ink droplets while moving in the main scanning direction. Once the allocation processing is completed, the pixel data in the matrix pattern is allocated to actual nozzles that form respective raster lines included in a print image.

The command addition processing is processing of adding command data corresponding to a printing method, to the rasterized data. The command data includes, for example, transport data related to transport specifications (a travel distance in the transport direction, a speed, and the like) of the printing medium (roll paper 5), and the like.

Such processing by the printer driver is performed by the ASIC 116 and the DSP 117 (see FIG. 2) under the control of the CPU 115. Then, the generated print data is transmitted by the print data transmission processing to the printer 100 through the printer interface unit 119.

Nozzle Array

Figure 4:
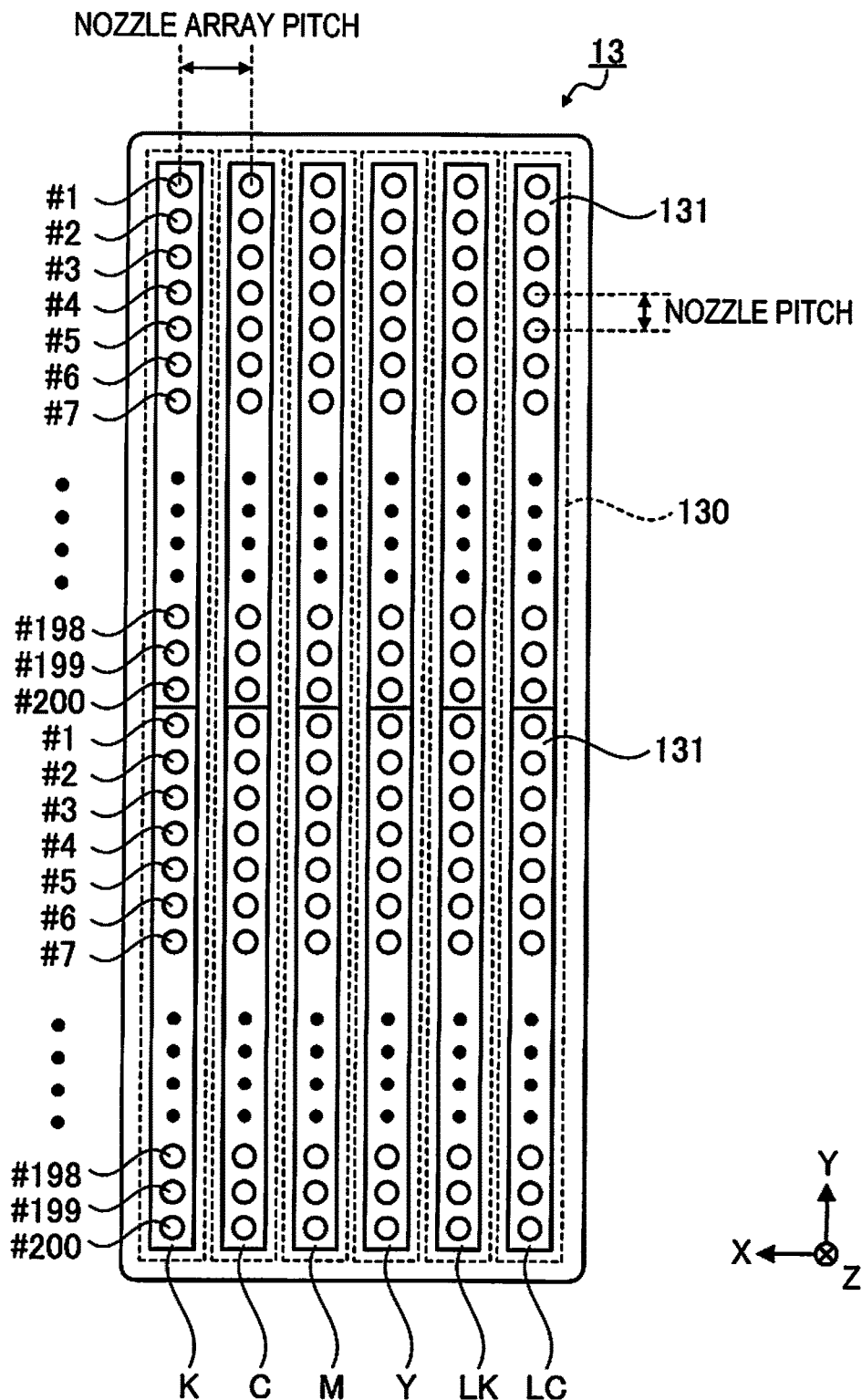
FIG. 4 is a schematic diagram showing an example of nozzle arrays seen from the lower side of a print head.

FIG. 4 is a schematic diagram showing an example of nozzle arrays seen from the lower side of the print head 13.

As shown in FIG. 4, the print head 13 includes six nozzle arrays 130 (black ink nozzle array K, cyan ink nozzle array C, magenta ink nozzle array M, yellow ink nozzle array Y, gray ink nozzle array LK, and light cyan ink nozzle array LC) having multiple nozzles arranged therein to eject respective colors of ink. The nozzle arrays 130 are aligned parallel to each other at regular intervals (nozzle array pitch) along the direction (X-axis direction) intersecting with the transport direction.

Each of the nozzle arrays 130 includes two nozzle chips 131 extended and arranged in series in the Y-axis direction. Each of the nozzle chips 131 has two hundred nozzles #1 to #200 arranged in line at regular intervals (nozzle pitch) along the transport direction (Y-axis direction).

The nozzle chip 131 is manufactured by a micro electro mechanical systems (MEMS) manufacturing process based on a semiconductor process, using a silicon wafer as a base material, for example. The two hundred nozzles in the nozzle chip 131 form "nozzle groups" having the same or similar ink ejection characteristics.

More specifically, the print head 13 including the "nozzle set" includes the nozzle chips 131 as the multiple "nozzle groups".

Moreover, for each of the nozzles, a drive element (piezoelectric element such as the piezo element described above) is provided to drive each nozzle and eject ink droplets.

Problems of Related Art

Figure 5:
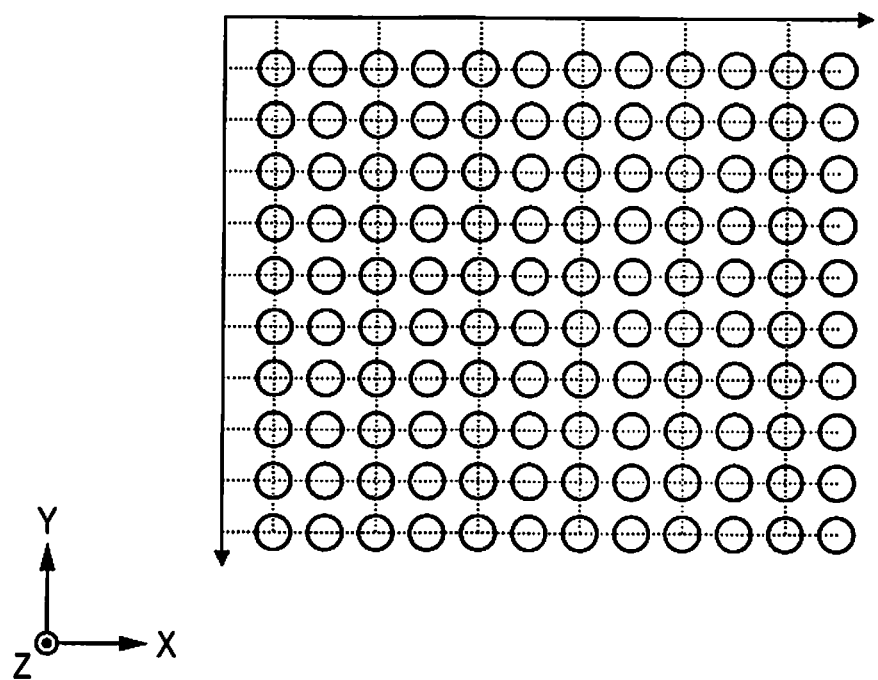
FIG. 5 is a conceptual diagram showing a matrix in a data space where halftone data is developed in halftone processing of the related art.

FIG. 5 is a conceptual diagram showing a matrix in a data space where the halftone data is developed in the halftone processing of the related art. The 1-bit data or 2-bit data corresponding to the dot formation state described above is developed at positions indicated by circles. Then, such data is subjected to the rasterization processing (allocation processing) to form dots based on the halftone data from the allocated nozzles.

Figure 6:
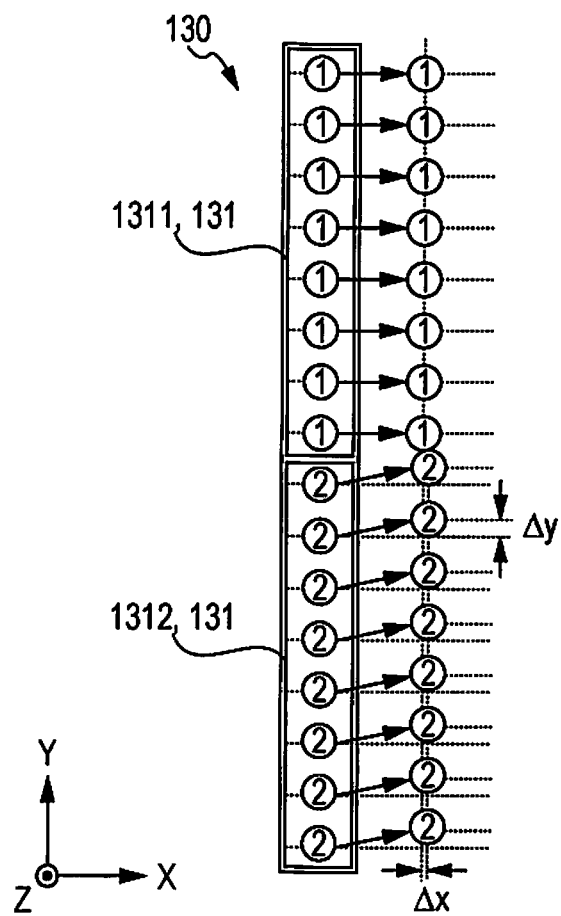
FIG. 6 is an explanatory diagram schematically showing an example where dot formation positions are shifted by a difference in ink ejection characteristics.

FIG. 6 is an explanatory diagram schematically showing an example where the dot formation positions are shifted by a difference in ink ejection characteristics among the nozzle chips 131 included in the nozzle array 130.

For ease of explanation, description is given of an example where the nozzle array 130 that ejects the same color of ink includes two nozzle chips 131 (nozzle chips 1311 and 1312) and each of the nozzle chips 131 includes eight nozzles.

For example, when eight dot positions formed in one shot by the nozzle chip 1312 are shifted by Δx in the X-axis direction (main scanning direction) and by Δy in the Y-axis direction (transport direction), as indicated by 2s in FIG. 6, from eight dot positions formed in the same shot by the nozzle chip 1311, unevenness in color density may be observed in a printed image.

Figure 7:
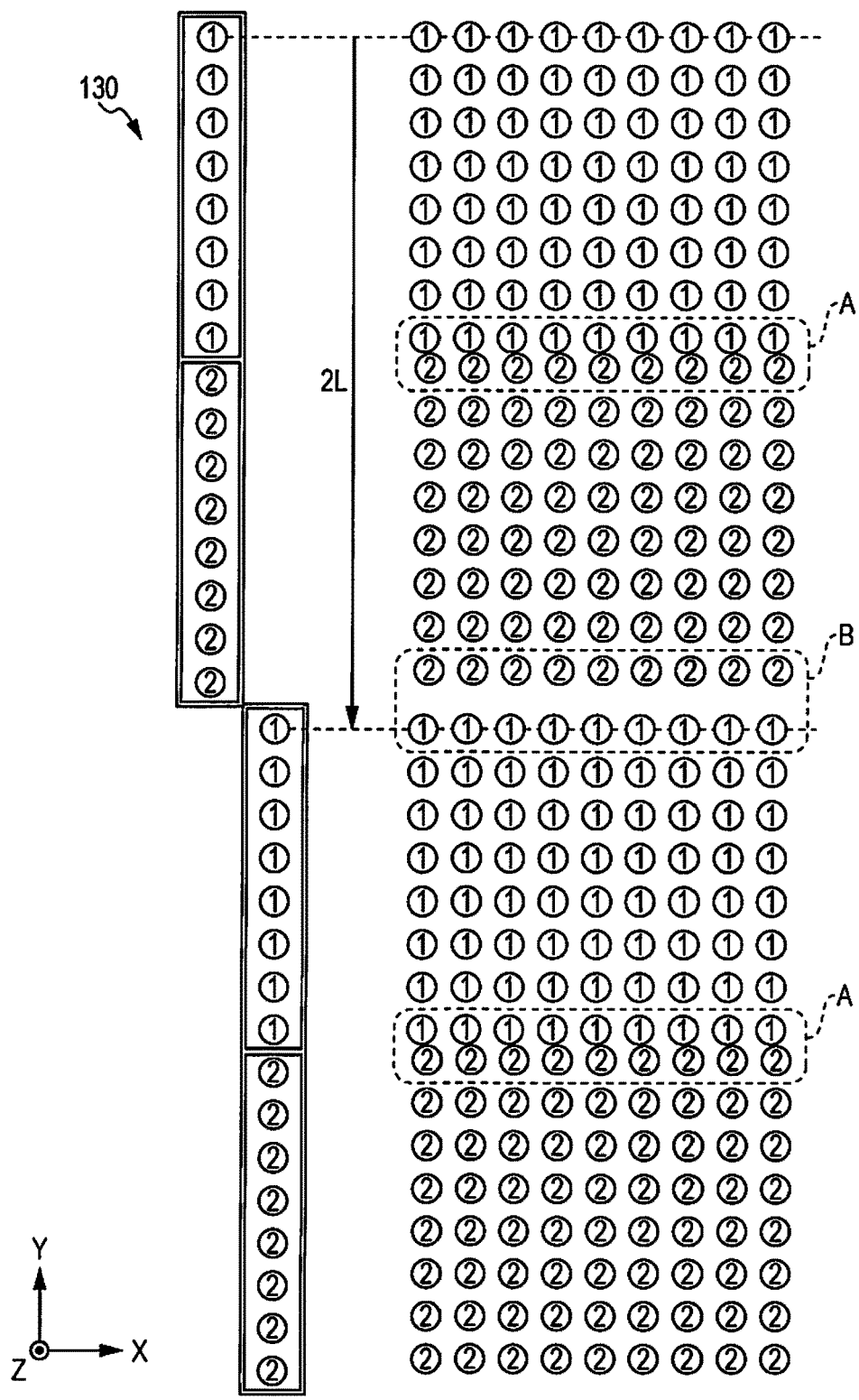
FIG. 7 is a schematic diagram showing an example where unevenness in color density is observed in an image printed according to the related art.
Figure 8:
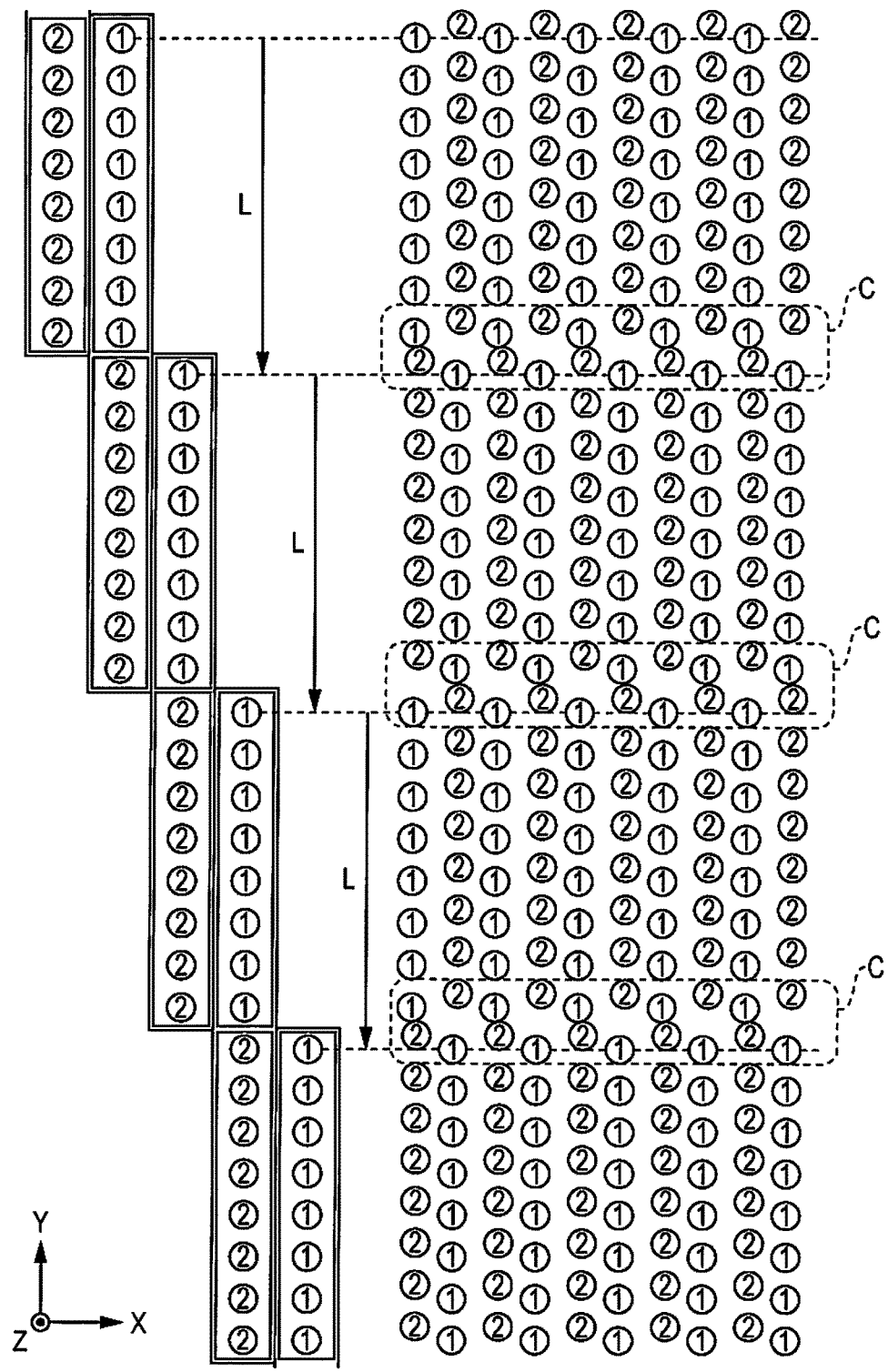
FIG. 8 is a schematic diagram showing an example where unevenness in color density is observed in an image printed according to the related art.

FIGS. 7 and 8 are schematic diagrams each showing an example where unevenness in color density is observed in a printed image according to the related art.

FIG. 7 shows an example where printing is performed by repeating a process wherein, after completion of image formation in a region (band) having a width 2L corresponding to the length of an array including 16 (8×2) nozzles, the printing medium (roll paper 5) is transported in the transport direction (+Y direction) according to the width 2L, and the bands are formed in line in the transport direction (Y-axis direction) such that an end of the band thus formed comes into contact with an end of a band formed in the next pass operation. When solid printing is performed with the maximum density, for example, large dots are formed at all dot positions indicated by 1s and 2s in FIG. 7.

In FIG. 7, relative positions of the nozzle arrays 130 through step movement of the printing medium (roll paper 5) by the feed amount 2L are shown in an oblique direction so that the nozzle arrays 130 do not overlap with each other. In other words, FIG. 7 shows as if the nozzle array 130 moves in the −Y-direction. However, in reality, the printing medium (roll paper 5) moves in the +Y-direction. Also, the positional relationship between the nozzle arrays 130 in the X-axis direction has no meaning.

In such a printing method, as is clear from FIG. 7, there are significant differences in dot density in regions surrounded by the broken lines, resulting in unevenness in color density observed in a printed image. To be more specific, black lines (dark lines) with high dot density are observed in regions A shown in FIG. 7, while a white line (light line) with low dot density is observed in a region B.

Meanwhile, FIG. 8 shows an example where printing is performed such that a boundary region between bands overlaps with a center region of the band by reducing the feed amount with the band width (2L) by half to L, in order to reduce such black lines (dark lines) and white lines (light lines) as described above. This is a method of forming one image region in two passes. More specifically, in the first pass operation, printing is performed with half the density in the X-axis direction (main scanning direction). Then, in the next pass operation, printing is performed so as to fill gap portions with the density reduced by half. This printing is performed by allocating the halftone data developed as shown in FIG. 5 to two pass operations through the allocation processing.

Since the black line (dark line) region with high dot density is combined with the white line (light line) region with low dot density by the method described above, the unevenness in color density is reduced. However, as can be seen from FIG. 8, unevenness due to lines in the X-axis direction is still observed as in regions C surrounded by broken lines shown in FIG. 8.

When such unevenness in color density is observed, for example, a positional shift of dots in the X-axis direction (main scanning direction) can be corrected by adjusting the timing of ejection from the nozzles during the pass operation. Meanwhile, a positional shift of dots in the Y-axis direction (transport direction) between different pass operations can be corrected by adjusting a transport amount (feed amount) between the pass operations.

However, for such adjustment, it is required to evaluate the ink ejection characteristics of the print head 13 (individual nozzle chips 131 included therein) in the individual printer 100 and to determine the adjustment amount (correction amount) based on the result of the evaluation. Also, the printer 100 needs to be provided with a mechanism (e.g., an ejection timing adjustment mechanism for each nozzle chip 131 or a transport amount adjustment mechanism for each pass operation) that can reflect each adjustment amount (correction amount) thus determined.

Image Processing

Figure 9:
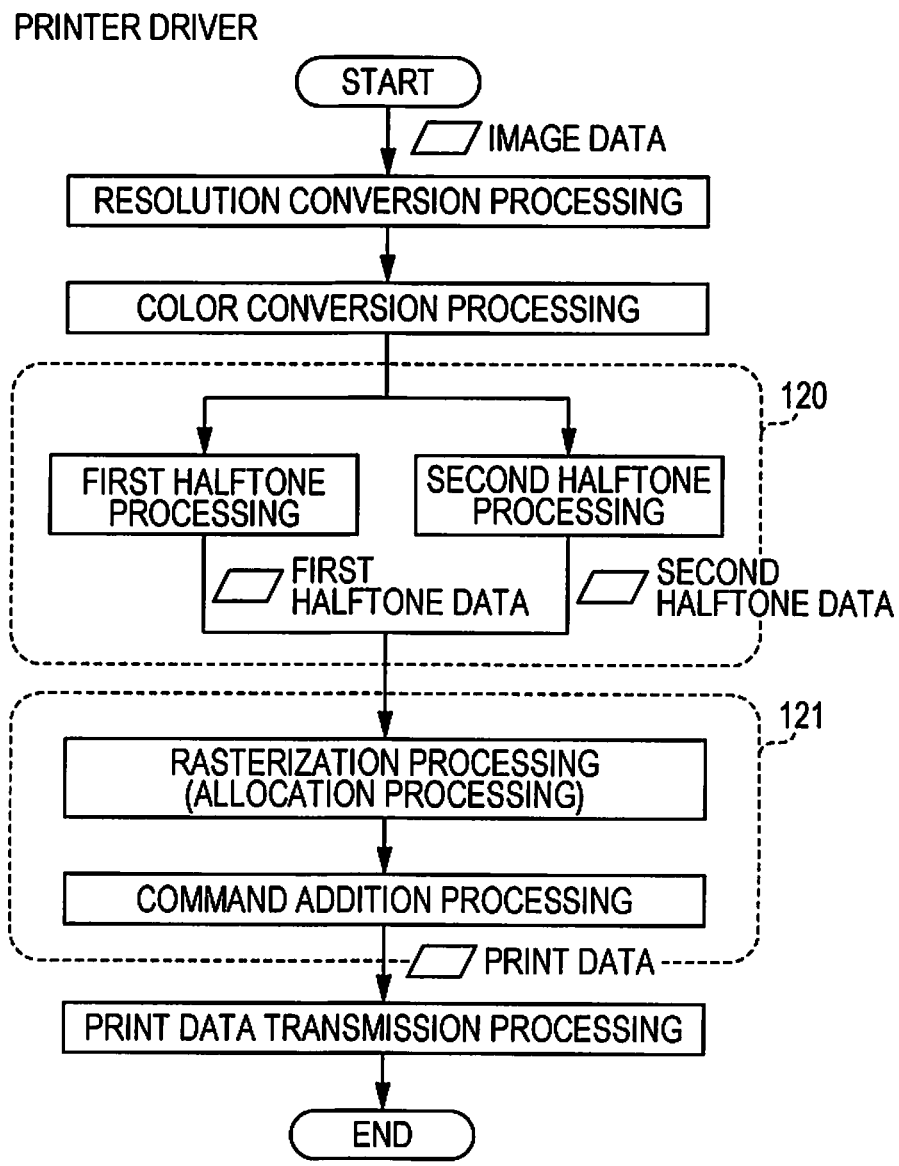
FIG. 9 is a flowchart showing functions of a printer driver included in an image processor according to Embodiment 1.

FIG. 9 is a flowchart showing functions of the printer driver included in the image processor 110 according to this embodiment.

To counter the problem described above, the image processor 110 includes a halftone processor 120 and an allocator 121 as functional units in the printer driver. More specifically, the halftone processor 120 performs multiple halftone processes for the same region of image data. In the halftone processes, halftone data is generated to determine the formation state of dots formed by a nozzle set that ejects the same color of ink. The allocator 121 allocates the generated halftone data to pass operations.

More specifically, in this embodiment, an image processing method of generating print data includes: performing multiple halftone processes for the same regions of image data, the halftone processes being to generate halftone data to determine the formation state of dots formed by the nozzle arrays 130 as the nozzle set that ejects the same color of ink; and allocating the generated halftone data to pass operations.

To be more specific, in the image processing according to the related art, print data is generated by performing the halftone processes all at once for the same region of image data (target region for generating the print data) and then allocating halftone data thus generated to pass operations. On the other hand, in the image processing according to this embodiment, print data is generated by performing multiple halftone processes for the same region (target region for generating the print data) and then allocating the result (multiple halftone data generated for each of the halftone processes) to pass operations.

Moreover, the multiple halftone processes for the same region of the image data is performed as the halftone process corresponding to each of the nozzle chips 131 as the nozzle groups included in the nozzle array 130.

This is described in more detail below.

First, as the simplest example, description is given of an example where different matrix coordinates in the halftone data are used for the multiple halftone processes for the same region of the image data. More specifically, matrix coordinates (matrix coordinates in the halftone data) where the determined formation state of dots is developed, for use in the multiple halftone processes for the same region of the image data, include different matrix coordinates. Moreover, as for printing, a method of forming one image region in two passes is employed as in the case of the method shown in FIG. 8. More specifically, in the first pass operation, printing is performed with half the density in the X-axis direction (main scanning direction), and the printing medium (roll paper 5) is transported by the feed amount L. Then, in the next pass operation, printing is performed so as to fill portions with the density reduced by half.

Figure 10:
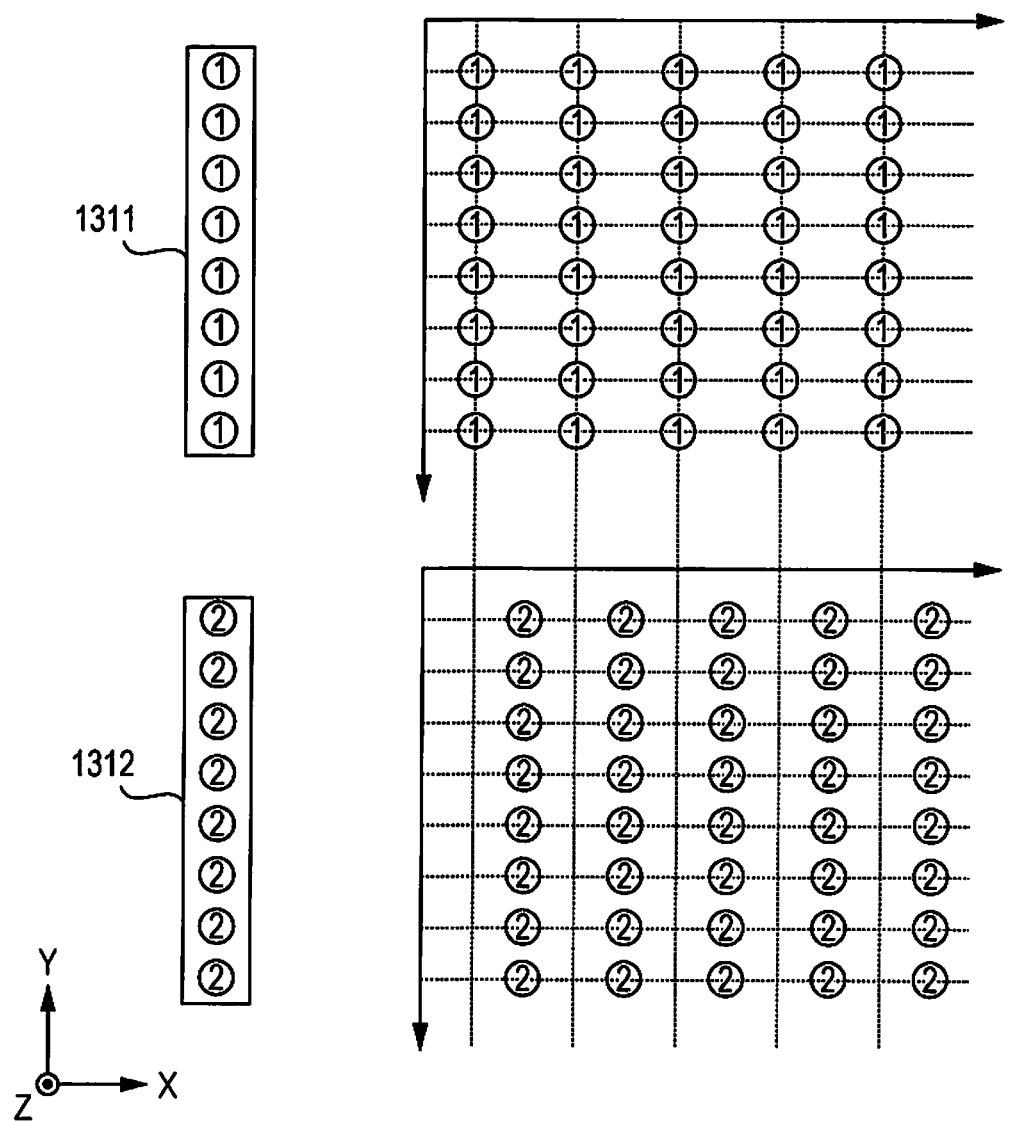
FIG. 10 is a conceptual diagram showing matrix coordinates in halftone data corresponding to respective nozzle chips.

FIG. 10 is a conceptual diagram showing matrix coordinates in halftone data corresponding to the respective nozzle chips 131 (nozzle chips 1311 and 1312).

In the halftone process corresponding to the nozzle chip 1311 (hereinafter referred to as the first halftone process), compared to the halftone data processing according to the related art shown in FIG. 5, the halftone data is developed so as to reduce the density by half in the X-axis direction (main scanning direction) at the matrix coordinates.

Meanwhile, in the halftone process corresponding to the nozzle chip 1312 (hereinafter referred to as the second halftone process), as in the case of the first halftone process, the halftone data is developed so as to reduce the density by half in the X-axis direction (main scanning direction) at the matrix coordinates, and such that the coordinate positions where the halftone data is developed fill gap portions between the coordinates where the halftone data is developed with the density reduced by half in the first halftone process, as shown in FIG. 10.

As shown in FIG. 9, the halftone processor 120 as one of the functional units in the printer driver performs such halftone processes (first halftone process and second halftone process) for the entire region of the image data (that is, performs the multiple halftone processes for the same region of the image data), thereby obtaining multiple halftone data (first halftone data corresponding to the first halftone process and second halftone data corresponding to the second halftone process).

The allocator 121 generates print data by merging the first and second halftone data and performing rasterization processing including allocation processing to the respective pass operations of the nozzle chips 1311 and 1312, and command addition processing.

Upon printing, the printer driver transmits the print data to the printer 100, the nozzle chip 1311 performs printing according to the print data allocated based on the first halftone data, and the nozzle chip 1312 performs printing according to the print data allocated based on the second halftone data.

In other words, to support such two-pass printing, the allocator 121 as one of the functional units in the printer driver generates print data by performing allocation based on the first halftone data for each pass of the nozzle chip 1311 and allocation based on the second halftone data for each pass of the nozzle chip 1312.

Figure 11:
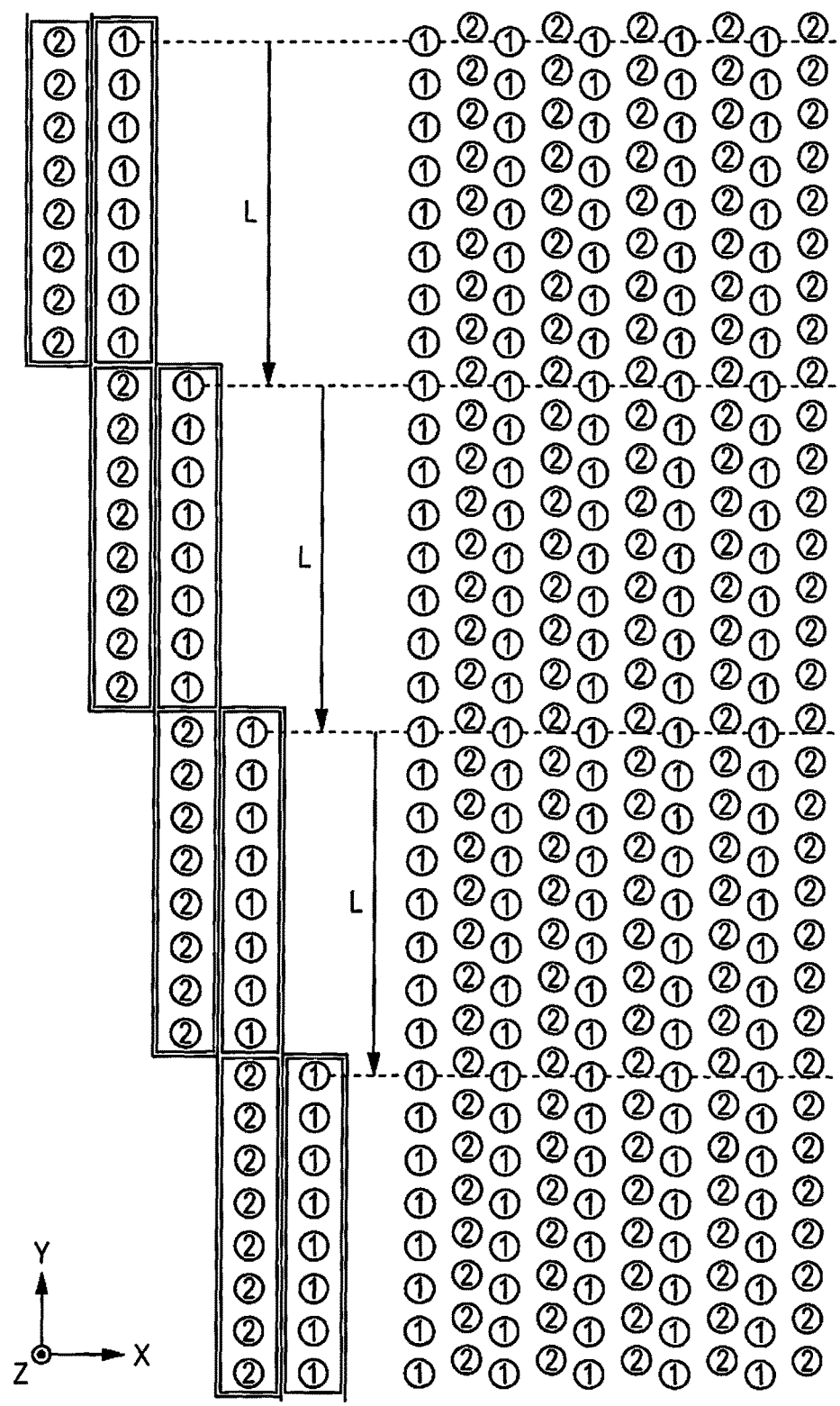
FIG. 11 is a conceptual diagram showing an image printed by a printing apparatus according to Embodiment 1.

FIG. 11 is a conceptual diagram showing an image printed by a printing apparatus (printing system 1) according to this embodiment.

In FIG. 11, dots indicated by 1s are those formed by the nozzle chip 1311 based on the first halftone data, while dots indicated by 2s are those formed by the nozzle chip 1312 based on the second halftone data.

At the respective dot positions, dots are formed based on the first halftone data or the second halftone data generated based on the image data (i.e., in the case of 2-bit halftone data, for example, any of no dot, small dot, medium dot, and large dot).

A printing method according to this embodiment includes: generating print data using the image processing method according to this embodiment described above; and performing printing based on the print data.

As is clear from FIG. 11, the printing method according to this embodiment eliminates a difference in dot density caused by a difference in ink ejection characteristics among different nozzle chips 131 in the Y-axis direction, since the printing is continuously performed in the Y-axis direction by the same nozzle chip 131. As a result, no unevenness due to lines in the X-axis direction is observed unlike the related art described above. Alternatively, the printing method according to this embodiment at least suppresses the unevenness due to lines in the X-axis direction observed in the related art described above.

As described above, the image processing method, the printing method, the image processing apparatus, and the printing apparatus according to this embodiment can achieve the following effects.

The image processing method includes: performing a first halftone process and a second halftone process for the same region of image data, as halftone processes to generate halftone data to determine the formation state of dots formed by the nozzle arrays 130 that eject the same color of ink; and allocating the generated halftone data to pass operations. More specifically, formation of a print image of each color can be performed using multiple halftone data (first halftone data and second halftone data) generated separately for the same region of the image data.

The multiple halftone processes for the same region of the image data include the first halftone process corresponding to the nozzle chip 1311 included in the nozzle array 130 and the second halftone process corresponding to the nozzle chip 1312 included in the nozzle array 130. More specifically, printing can be performed using halftone data generated separately for each nozzle chip 131.

As a result, by allowing the respective nozzle chips 131 (nozzle chips 1311 and 1312) to perform printing across the entire image region, a print image with no color unevenness (suppressed color unevenness) can be obtained for each nozzle chip 131 (each of the nozzle chips 1311 and 1312) based on uniform ink ejection characteristics (including no variation among the nozzle chips 131). Moreover, such a print image with suppressed color unevenness can be printed, even when there is a variation in ink ejection characteristics among the nozzle chips 131, by sharing printing with the respective nozzle chips 131 (allocating to pass operations) so that a print image based on image data is formed by superimposing print images for the respective nozzle chips 131.

As a result, there is no longer need to perform correction corresponding to the ink ejection characteristics of each nozzle chip 131 in order to suppress a variation in ink ejection characteristics among the nozzle chips 131. That is, there is no longer need to obtain a correction amount corresponding to the ink ejection characteristics of each nozzle chip 131. Moreover, there is no longer need to provide a correction section that corrects the correction amount obtained for each nozzle chip 131.

Meanwhile, the nozzle chips 1311 and 1312 are manufactured by the MEMS manufacturing process based on the semiconductor process. The two hundred nozzles in the nozzle chip 131 form "nozzle groups" having the same or similar ink ejection characteristics.

Therefore, a print image with less variation among the nozzles and no color unevenness (or suppressed color unevenness) can be obtained for each nozzle chip 131 (each of the nozzle chips 1311 and 1312). Moreover, such a print image with no color unevenness (or suppressed color unevenness) can be efficiently printed by sharing printing with the respective nozzle chips 131 (allocating to pass operations) so that a print image based on image data is formed by superimposing print images for the respective nozzle chips 131.

Meanwhile, as for matrix coordinates where halftone data (first halftone data and second halftone data) determined in multiple halftone processes (first and second halftone processes) for the same region of the image data, different matrix coordinates are used as shown in FIG. 10. Therefore, compared to the case where print images are formed based on the halftone data obtained by developing the result of the halftone processes based on the same image data at the same matrix coordinates, printing with higher uniformity of in-plane distribution of ink can be performed.

Moreover, the printing method according to this embodiment enables efficient printing of a print image with suppressed color unevenness, even with the printing system 1 (printing apparatus) including the multiple nozzle chips 131 having a difference in ink ejection characteristics (variation in ink ejection amount or ejection direction).

As a result, there is no longer need to perform correction corresponding to the ink ejection characteristics of each nozzle chip 131. That is, there is no longer need to obtain a correction amount corresponding to the ink ejection characteristics of each nozzle chip 131. Moreover, there is no longer need to provide a correction section that corrects the correction amount obtained for each nozzle chip 131.

The image processor 110 according to this embodiment eliminates the need to perform correction corresponding to the ink ejection characteristics of each nozzle chip 131 in order to suppress a variation in ink ejection characteristics among the nozzle chips 131 in the printing system 1 (printing apparatus). That is, the image processor 110 according to this embodiment eliminates the need to obtain a correction amount corresponding to the ink ejection characteristics of each nozzle chip 131, and also to provide a correction section that corrects the correction amount obtained for each nozzle chip 131.

Furthermore, the printing system 1 (printing apparatus) according to this embodiment can efficiently print a print image with suppressed color unevenness, without performing correction corresponding to the ink ejection characteristics of each nozzle chip 131, even when there is a variation in ink ejection characteristics among the nozzle chips 131 included in the print unit 10. More specifically, the printing system 1 (printing apparatus) according to this embodiment eliminates the need to obtain a correction amount corresponding to the ink ejection characteristics of each nozzle chip 131 and also to provide a correction section that corrects the correction amount obtained for each nozzle chip 131 during manufacturing or adjustment. Thus, the printing system 1 (printing apparatus) according to this embodiment is manufactured or adjusted more easily and provided at a lower cost.

Note that, in this embodiment, with reference to FIG. 10, the description is given of the example where different matrix coordinates in halftone data are used in the multiple halftone processes for the same region of the image data. However, the method wherein printing is performed with half the density in the X-axis direction (main scanning direction) in the first pass operation, the printing medium (roll paper 5) is transported by the feed amount L, and then printing is performed so as to fill portions with the density reduced by half in the next pass operation is not limited to the pattern example shown in FIG. 10 but may be those shown in FIGS. 12 to 14, for example.

Figure 12:
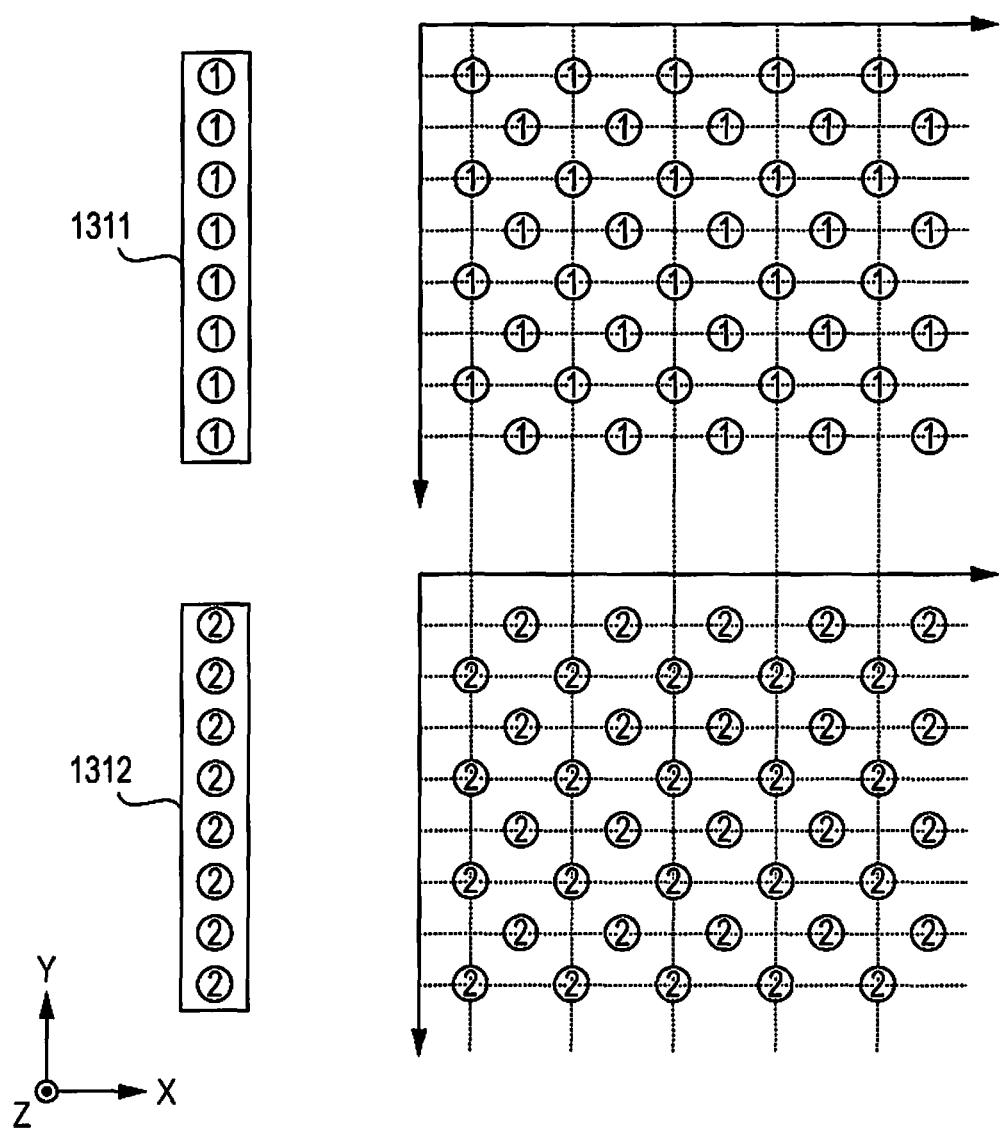
FIG. 12 is a conceptual diagram showing another example of matrix coordinates in halftone data corresponding to the respective nozzle chips.
Figure 13:
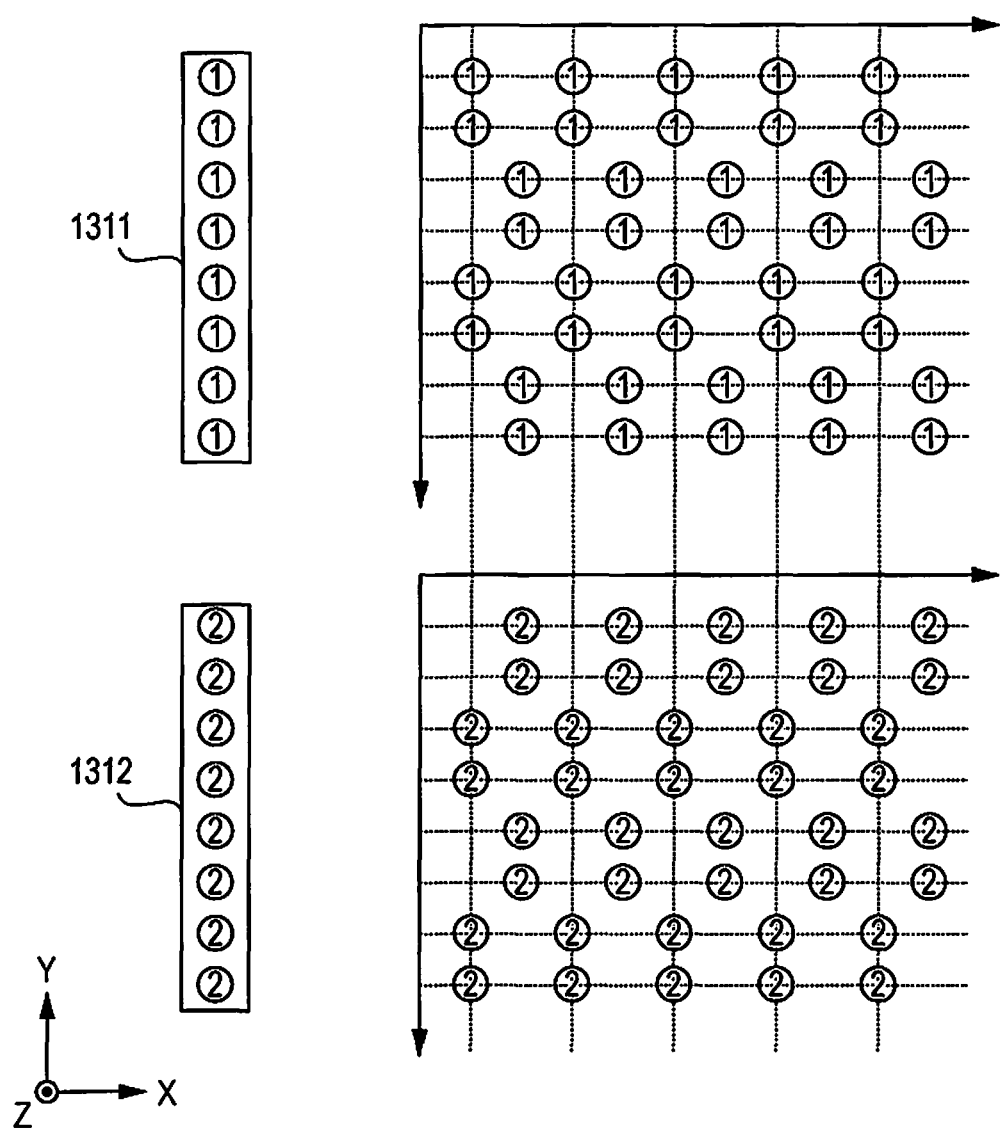
FIG. 13 is a conceptual diagram showing another example of matrix coordinates in halftone data corresponding to the respective nozzle chips.
Figure 14:
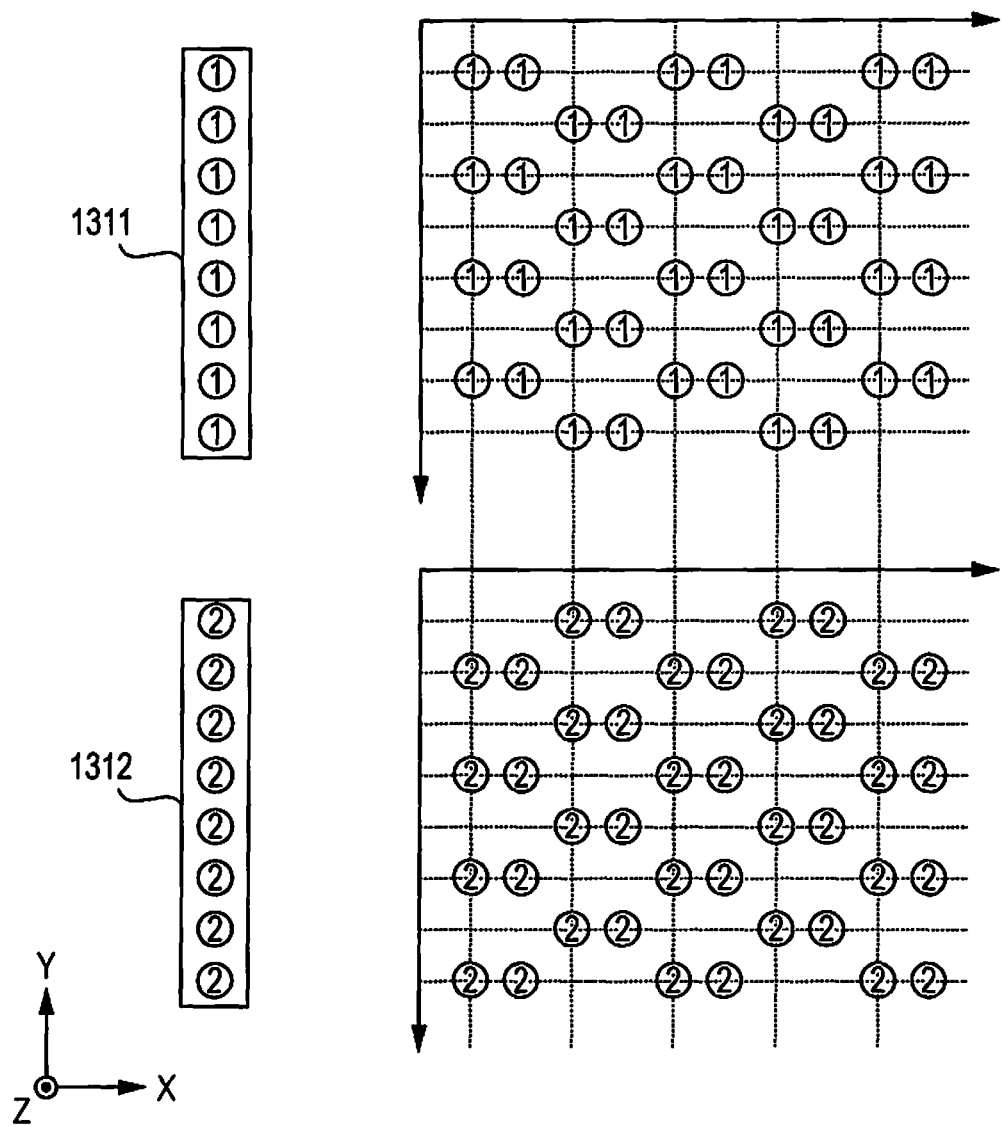
FIG. 14 is a conceptual diagram showing another example of matrix coordinates in halftone data corresponding to the respective nozzle chips.

FIGS. 12 to 14 are conceptual diagrams showing other examples of matrix coordinates in halftone data corresponding to the respective nozzle chips 131 (nozzle chips 1311 and 1312).

As a method of developing the halftone data so as to reduce the density in the X-axis direction (main scanning direction) by half at the matrix coordinates may be, for example, a method of developing the halftone data in a houndstooth check pattern (checkered flag pattern) may be used as shown in FIG. 12. Alternatively, a method of developing the halftone data in a houndstooth check pattern (checkered flag pattern) with two dots may be used as shown in FIGS. 13 and 14. However, the method is not limited to the range of the examples shown in FIGS. 10 and 12 to 14.

Note that the invention is not limited to the above embodiment, but various changes, modifications, and the like can be made to the above embodiment. Modified examples are described below. Here, the same constituent components as those in the above embodiment are denoted by the same reference numerals, and repetitive description thereof is omitted.

In Embodiment 1, the description is given of the example where the dot density is previously reduced for the number of pass operations in the halftone processes performed separately for each nozzle chip 131 (that is, the halftone process with reduced concentration is performed), and the halftone data is developed while shifting the matrix coordinates so that the dot positions formed in each pass do not overlap with each other. However, such multiple different halftone processes performed for each nozzle chip 131 are not limited to the above method.

Modified Example 1

In an image processing method according to Modified Example 1, dither matrices (dither masks) for use in multiple halftone processes to be applied include different dither matrices.

More specifically, a dither matrix for use in a first halftone process performed for the nozzle chip 1311 is different from a dither matrix for use in a second halftone process performed for the nozzle chip 1312.

Note that, depending on dither matrices to be applied, there may be a risk of influence of interference (generation of interference pattern or the like) between print images. Therefore, it is preferable that dither matrices are determined by previously performing sufficient evaluation.

According to this modified example, a print image for each nozzle chip 131 is formed based on halftone data developed by different dither matrices. Therefore, compared to the case where print images formed using the respective nozzle chips 131 are formed based on the same halftone data generated by performing the halftone processes on the same image data using the same dither matrix, a difference in ink ejection characteristics among the nozzle chips 131 can be dispersed within the image region. Thus, printing can be performed while further suppressing reduction in printing quality.

Modified Example 2

In an image processing method according to Modified Example 2, multiple halftone processes to be applied include a halftone process using a dither method and a halftone process using an error diffusion method.

More specifically, for example, halftone data is developed using the dither method in the first halftone process performed for the nozzle chip 1311, while halftone data is developed using the error diffusion method in the second halftone process performed for the nozzle chip 1312.

According to this modified example, print images formed by the respective nozzle chips 131 are formed based on the different halftone data obtained by the different halftone processes, including the halftone process using the dither method and the halftone process using the error diffusion method. Therefore, when the print images formed by the nozzle chips 131 having different ink ejection characteristics are superimposed in the same region, a difference in ink ejection characteristics among the nozzle chips 131 can be dispersed within the image region, compared to the case where the respective print images are formed based on the same halftone data generated by performing the same halftone processes on the same image data. Thus, printing can be performed while further suppressing reduction in printing quality.

Modified Example 3

In an image processing method according to Modified Example 3, halftone data is developed using an error diffusion method in each of multiple halftone processes to be applied, and the error diffusion method used includes different error diffusion methods.

More specifically, an error diffusion method for use in a first halftone process performed for the nozzle chip 1311 is different from an error diffusion method for use in a second halftone process performed for the nozzle chip 1312.

The error diffusion method is a method whereby, during development of image data to halftone data by a halftone process, a quantization error in binarization of each target pixel in the image data is diffused into the tone values of unbinarized pixels near the target pixel and thereafter the tone values of pixels are sequentially binarized.

The different error diffusion methods include methods different in the direction or range of pixels in which the quantization error is diffused, a threshold value for judging whether to diffuse the quantization error, and the like when the quantization error is diffused to the tone values of the unbinarized pixels near the target pixels.

According to this modified example, print images formed by the respective nozzle chips 131 are formed based on the halftone data developed using the different error diffusion methods. Therefore, compared to the case where the respective print images are formed based on the same halftone data generated by performing the halftone processes on the same image data using the same error diffusion method, a difference in ink ejection characteristics among the nozzle chips 131 can be dispersed within the image region. Thus, printing can be performed while further suppressing reduction in printing quality.

Note that, with the use of the multiple different halftone processes as in Modified Examples 1 to 3, it is not necessarily required to shift the matrix coordinates to develop the halftone data as in Embodiment 1 described with reference to FIG. 10. However, in order to perform printing with high uniformity of in-plane distribution of ink, it is preferable to shift the matrix coordinates to develop the halftone data.

Modified Example 4

In Embodiment 1 and Modified Examples 1 to 3, the description is given of the example where the nozzle array 130 includes the two nozzle chips 131. However, the invention is not limited thereto.

For example, a method may be adopted wherein different halftone processes are performed as described above for the two nozzles included in the nozzle array 130, respectively, and the results of printing performed are stacked. Alternatively, the nozzle array 130 may include three or more nozzle chips 131.

Figure 15:
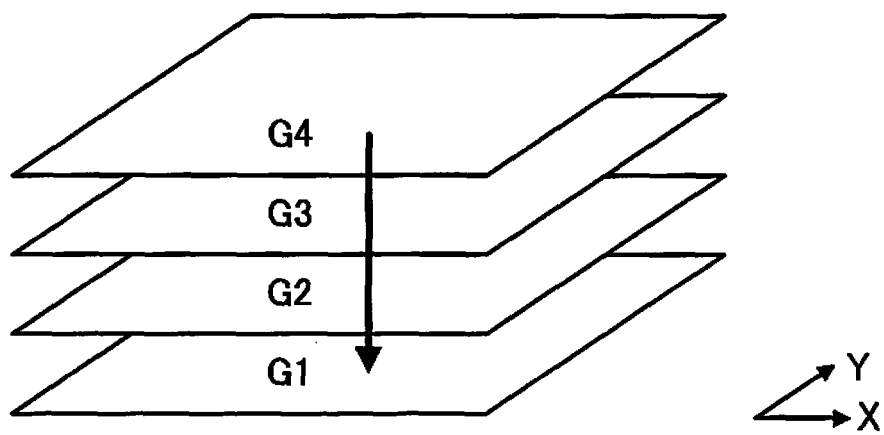
FIG. 15 is a conceptual diagram showing how a desired print image is obtained by superimposing four images printed by four nozzle chips.

FIG. 15 is a conceptual diagram showing how a desired print image is obtained by superimposing images (images G1 to G4) printed by four nozzle chips 131 included in the nozzle array 130.

Figure 16:
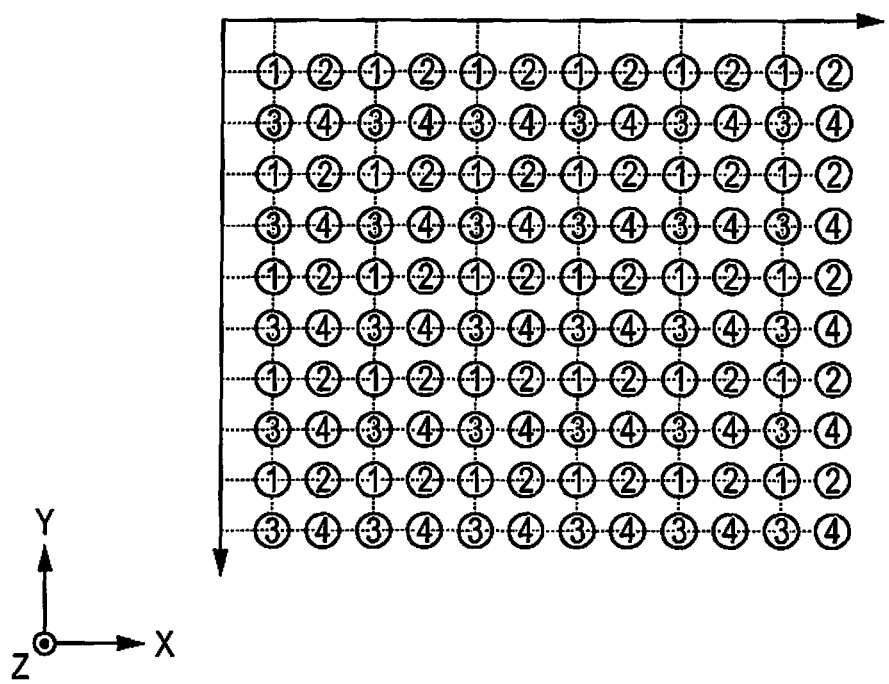
FIG. 16 is a conceptual diagram showing an example of the positions of dots formed in the four images printed by the four nozzle chips.
Figure 17:
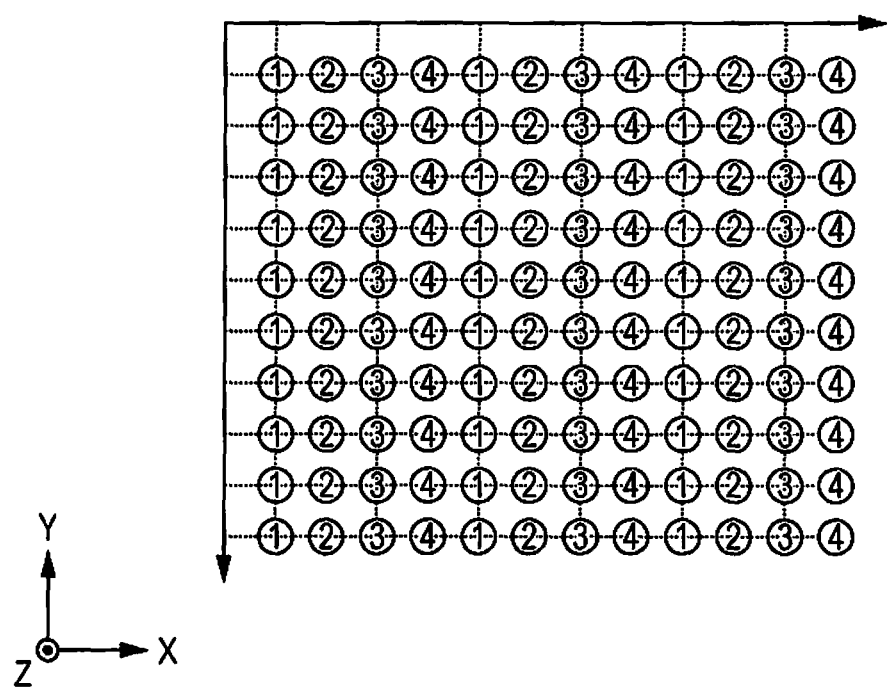
FIG. 17 is a conceptual diagram showing an example of the positions of dots formed in the four images printed by the four nozzle chips.

FIGS. 16 and 17 show examples of the positions of dots formed in the printed images (images G1 to G4). An image Gn is formed of dots formed at the positions indicated by the numbers n (n=1 to 4). More specifically, matrix coordinates where halftone data is developed by halftone processes corresponding to the four nozzle chips, respectively, are those where the respective numbers are arranged at the positions shown in FIGS. 16 and 17. In other words, the matrix coordinates for developing the halftone data for use in four halftone processes to be applied include four different matrix coordinates.

By developing the halftone data at the different matrix coordinates as described above, compared to the case where print images are formed based on the halftone data obtained by developing the result of the halftone processes based on the same image data at the same matrix coordinates, printing with higher uniformity of in-plane distribution of ink can be performed.

What is claimed is:

1. An image processing method of generating print data to cause a printing apparatus that prints a print image based on image data to execute printing, by repeating a pass operation in which a nozzle set forms dots on a printing medium by ejecting ink droplets while moving relative to the printing medium in a main scanning direction, and a feed operation in which the nozzle set and the printing medium are moved relative to each other in a sub-scanning direction that intersects with the main scanning direction, the nozzle set including a plurality of nozzle groups that eject a same color of ink, the image processing method comprising:
    performing a first halftone process and a second halftone process for a same region of the image data to respectively generate a first halftone data to determine a formation state of first dots and a second halftone data to determine a formation state of second dots, the first dots and the second dots being formed by the plurality of nozzle groups that eject the same color of ink; and
    allocating the first halftone data and the second halftone data to pass operations.

2. The image processing method according to claim 1, wherein
    the nozzle set includes a first nozzle group and a second nozzle group, and
    the first halftone process corresponds to the first nozzle group and the second halftone process corresponds to the second nozzle group.

3. A printing method comprising:
    generating print data using the image processing method according to claim 2; and
    performing printing by the printing apparatus based on the print data.

4. The image processing method according to claim 1, wherein
    the performing of the first halftone process and the second halftone process includes performing the first halftone process using a dither method and performing the second halftone process using an error diffusion method.

5. A printing method comprising:
    generating print data using the image processing method according to claim 4; and
    performing printing by the printing apparatus based on the print data.

6. The image processing method according to claim 1, wherein
    the performing of the first halftone process and the second halftone process includes performing the first halftone process using a first dither matrix and performing the second halftone process using a second dither matrix that is different from the first dither matrix.

7. A printing method comprising:
    generating print data using the image processing method according to claim 6; and
    performing printing by the printing apparatus based on the print data.

8. The image processing method according to claim 1, wherein
    the performing of the first halftone process and the second halftone process includes performing the first halftone process using a first error diffusion method and performing the second halftone process using a second error diffusion method that is different from the first error diffusion method.

9. A printing method comprising:
generating print data using the image processing method according to claim 8; and
performing printing by the printing apparatus based on the print data.

10. The image processing method according to claim 1, wherein
the performing of the first halftone process and the second halftone process includes performing the first halftone process using a first matrix coordinate where the formation state of the first dots is developed, and performing the second halftone process using a second matrix coordinate where the formation state of the second dots is developed, the first matrix coordinate being different from the second matrix coordinate.

11. A printing method comprising:
generating print data using the image processing method according to claim 10; and
performing printing by the printing apparatus based on the print data.

12. A printing method comprising:
generating the print data using the image processing method according to claim 1; and
performing printing by the printing apparatus based on the print data.

13. The image processing method according to claim 1, wherein
the plurality of nozzle groups include a first nozzle group and a second nozzle group,
the performing of the first halftone process generates the first halftone data so that the first nozzle group forms the first dots, and
the performing of the second halftone process generates the second halftone data so that the second nozzle group forms the second dots.

14. An image processor which generates print data to cause a printing apparatus that prints a print image based on image data to execute printing, by repeating a pass operation in which a nozzle set forms dots on a printing medium by ejecting ink droplets while moving relative to the printing medium in a main scanning direction, and a feed operation in which the nozzle set and the printing medium are moved relative to each other in a sub-scanning direction that intersects with the main scanning direction, the nozzle set including a plurality of nozzle groups that eject a same color of ink, the image processor comprising:
a halftone processor configured to perform a first halftone process and a second halftone process for a same region of the image data to respectively generate a first halftone data to determine a formation state of first dots and a second halftone data to determine a formation state of second dots, the first dots and the second dots being formed by the plurality of nozzle groups that eject the same color of ink; and
an allocator configured to allocate the first halftone data and the second halftone data to pass operations.

15. A printing apparatus comprising:
the image processor according to claim 14; and
a print unit configured to perform printing based on the print data generated by the image processor.

* * * * *